Feb. 16, 1926.

C. L. REIN

ANTIGLARE HEADLIGHT FRONT

Filed Sept. 10, 1923

1,573,451

Inventor
Charles L. Rein
By John W. Llarley
Attorney

Patented Feb. 16, 1926.

1,573,451

UNITED STATES PATENT OFFICE.

CHARLES L. REIN, OF BALTIMORE, MARYLAND.

ANTIGLARE HEADLIGHT FRONT.

Application filed September 10, 1923. Serial No. 661,780.

*To all whom it may concern:*

Be it known that I, CHARLES L. REIN, a citizen of the United States, residing at Baltimore, in the State of Maryland, have invented certain new and useful Improvements in Antiglare Headlight Fronts; and I do hereby declare the following to be a full, clear, and exact description of the invention, such as will enable others skilled in the art to which it appertains to make and use the same.

My invention relates to anti-glare fronts for headlights.

Among the objects of my invention are:—

To produce a front composed of glass so shaped or colored that the rays from the lamp contained within the headlight will be so directed that a minimum of light from said lamp will reach the eyes of a driver in a car approaching the automobile having headlights equipped with my improved front.

To produce a headlight front formed of glass and provided with three portions each having characteristics differing from those of the others:

One portion being formed of translucent glass, or glass of such composition or coloring that it will absorb a large number of the rays proceeding from the lamp in the headlight.

The second portion being formed of transparent glass so that rays proceeding from the lamp in the headlight will pass therethrough with a minimum of absorption.

The third portion being formed in the shape of a lens or otherwise shaped so as to condense the rays of light proceeding from the lamp in the headlight and direct said rays upon the road at a greater distance from the headlight than the distance therefrom at which the rays are directed through the transparent portion of my improved front.

In carrying out my invention I make use of the instrumentalities illustrated in the accompanying drawings, in which:—

Figure 1:
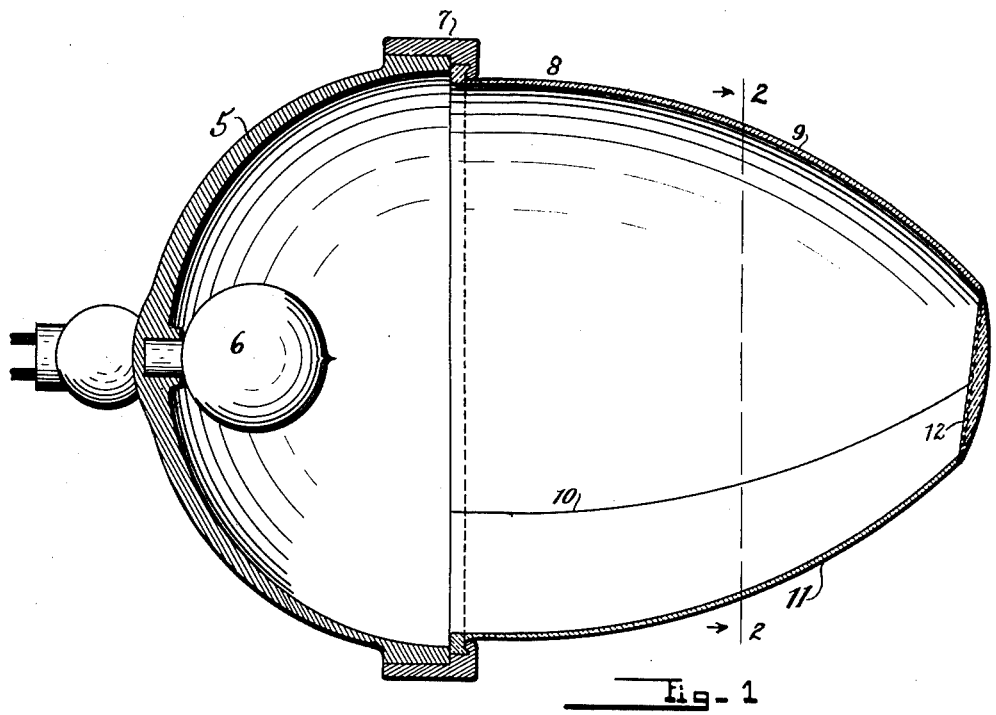
Figure 1 is a central longitudinal section of a headlight equipped with my improved front.
Figure 2:
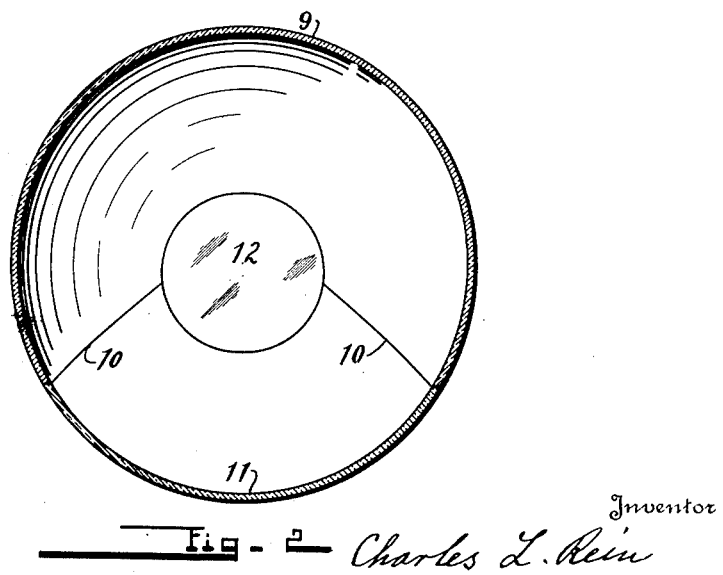
Fig. 2 is a section along the line 2—2 in Fig. 1 looking in the direction of the arrows.

5 is the reflector of the headlight which may be of any approved shape and provided with any approved reflecting surface.

6 is a lamp which is mounted in any approved form of socket and connected to a source of electricity.

7 is the usual clamping ring which encircles the front of a headlight and said ring clamps my improved front 8 in place.

My improved front is formed of glass and is provided with a portion 9 which extends around the upper part of my improved front and down the sides thereof to the lines 10—10. The portion 9 is formed of glass having such a composition, or colored, or otherwise treated that light passing from the lamp 6 will be largely absorbed so that when the portion 9 is viewed by a driver in an approaching automobile, it will show nothing but a faint opalescence, iridescence or colored illumination.

The portion 11 which extends around the lower part of my improved front between the lines 10—10 is formed of transparent glass so that rays of light passing from the lamp 6 will suffer but little absorption therein. The portion 11 is shaped and located so that when my improved front is used upon the headlight of an automobile, rays of light passing from the lamp 6 will illuminate the road up to any predetermined distance from the headlight. This distance is determined by the ordinary adjustment, (not shown), of the lamp 6 within the reflector 5 and by the adjustment of the headlight upon its supports.

The portion 12 of my improved headlight is formed of transparent glass in the shape of a lens having such curvature that rays of light passing from the lamp 6 will be directed upon the road at a distance from the headlight greater than the distance at which the rays passing through the portion 11 reach said road. The lens, therefore, illuminates strongly a portion of the road at a considerable distance from the automobile and discloses the pedestrians walking upon said road.

It is to be noted that the lens shaped portion 12 is placed at such an angle with reference to the axis of the headlight that none of the rays passing therethrough will reach the eyes of the driver of an approaching automobile.

By having my improved front shaped to extend a considerable distance in front of the headlight, I insure that the portion 9 will effectually cut off from the eyes of the driver of an approaching automobile the major portion of the rays of light passing upward from the lamp 6.

While I have shown one arrangement of the portions of my improved front, yet it is to be understood that I do not desire to be limited to the exact shapes of the portions shown, nor to the exact relations of said portions shown, for changes may be made in the shapes of said portions and their relative arrangements without departing from the spirit of my invention.

I claim:—

In a headlight, the combination with a dome shaped front composed of an upper translucent and a lower transparent portion, the juncture of said portions at the forward end of said front forming an opening disposed on the longitudinal axis of said headlight, of a lens, positioned in said opening, vertically inclined to said axis and having a curvature for directing rays of light passing therethrough to a greater distance than those passing through said transparent portion.

In testimony whereof, I affix my signature.

CHARLES L. REIN.